United States Patent [19]

Andre et al.

[11] Patent Number: 5,106,225
[45] Date of Patent: Apr. 21, 1992

[54] ADJUSTABLE SPACER

[75] Inventors: Guy Andre, Seyssinet Pariset; Charles Barnavol, Grenoble, both of France

[73] Assignee: A. Raymond KG, Lorrach, Fed. Rep. of Germany

[21] Appl. No.: 568,969

[22] Filed: Aug. 17, 1990

[30] Foreign Application Priority Data

Aug. 21, 1989 [DE] Fed. Rep. of Germany ....... 3927529

[51] Int. Cl.⁵ .............................................. F16D 1/00
[52] U.S. Cl. ................ 403/408.1; 403/405.1; 411/57
[58] Field of Search ............... 403/248, 289, 290, 310, 403/359, 344, 405.1, 408.1; 411/55, 57, 60, 508–510, 913

[56] References Cited

U.S. PATENT DOCUMENTS

| | | | |
|---|---|---|---|
| 3,534,797 | 10/1970 | Relnhard | 411/182 X |
| 3,579,942 | 5/1971 | Cole | 411/57 X |
| 4,579,492 | 4/1986 | Kazino et al. | 411/182 X |
| 4,729,606 | 3/1988 | Narita et al. | 403/408.1 X |
| 4,760,495 | 7/1988 | Till | 411/55 X |
| 4,834,600 | 5/1989 | Lemke | 411/55 |
| 4,890,966 | 1/1990 | Umezawa | 411/57 X |
| 4,978,264 | 12/1990 | Philippe | 411/55 X |

FOREIGN PATENT DOCUMENTS

| | | | |
|---|---|---|---|
| 251982 | 1/1967 | Fed. Rep. of Germany | 411/182 |
| WO8701419 | 3/1987 | PCT Int'l Appl. | 411/182 |

Primary Examiner—Andrew V. Kundrat
Attorney, Agent, or Firm—Finnegan, Henderson, Farabow, Garrett & Dunner

[57] ABSTRACT

An adjustable spacer made of plastic for securing two plate-shaped components together with variable spacing, including an anchoring part adapted to be inserted into and secured in a hole of first one of said components and having a cylindrical hollow shaft with a threaded portion on its internal surface and a spacing screw part having a threaded shaft that can be screwed into the hollow shaft of the anchoring part to adjust the spacing between the two parts. The spacing screw part has a supporting head on its upper end and on its lower end below the threaded shaft an expanding stem made up of a plurality of separate downwardly extending legs connected at their upper ends to the threaded shaft. A through-hole extends through the screw part that tapers in the expanding stem to a narrower hole for receipt of threaded member at least one axis-parallel rib is provided on the external surface of each leg. In addition, a plurality of axis parallel grooves are provided on the internal surface of the hollow shaft of the anchoring part below its threaded portion so that when a threaded member is screwed into the through-hole of the spacing screw part to secure the second plate component to the supporting head of the spacing screw part, the grooves will receive the ribs of the legs of the expanding stem in a positive locking manner.

3 Claims, 2 Drawing Sheets

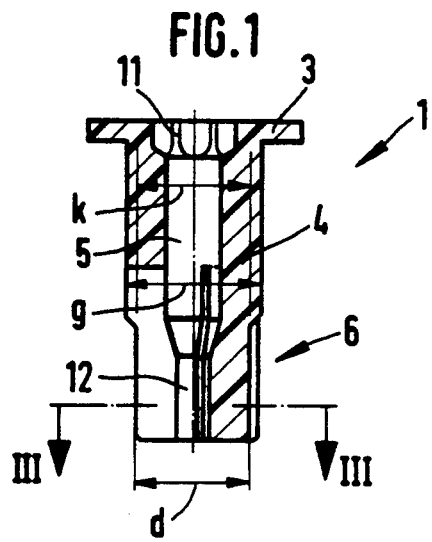
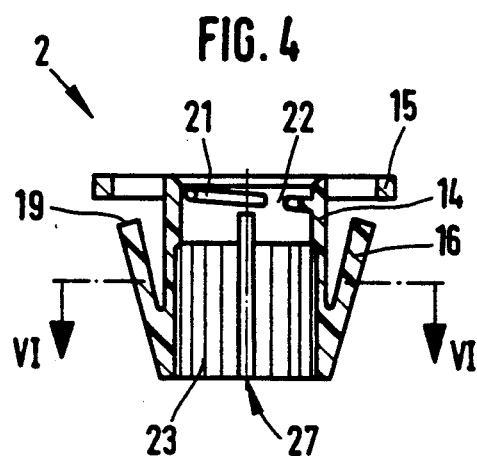
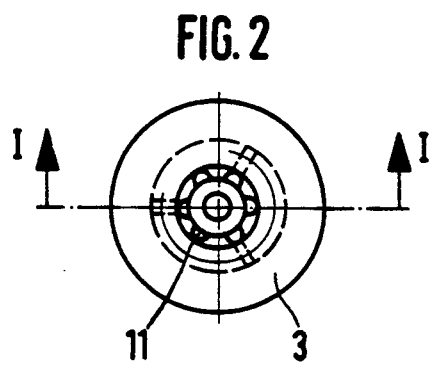
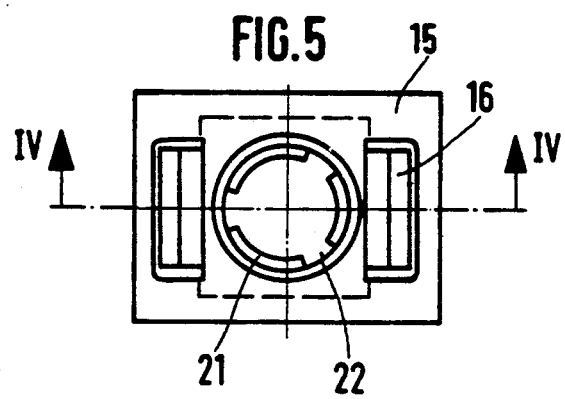
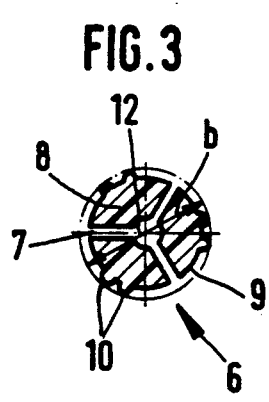
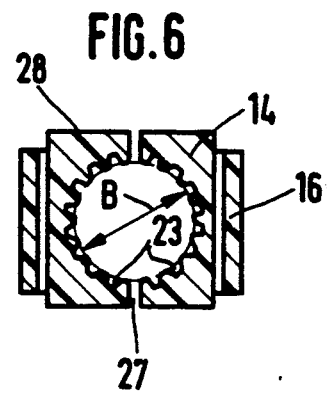

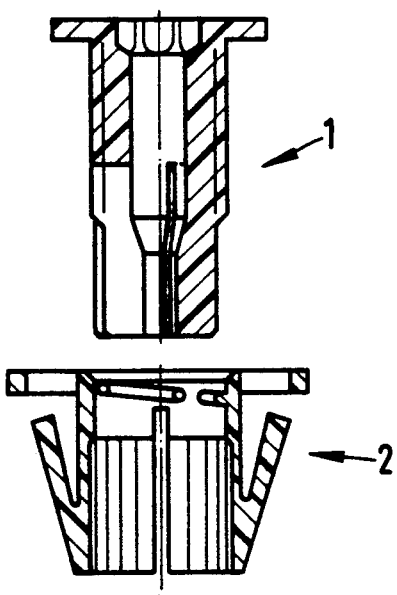
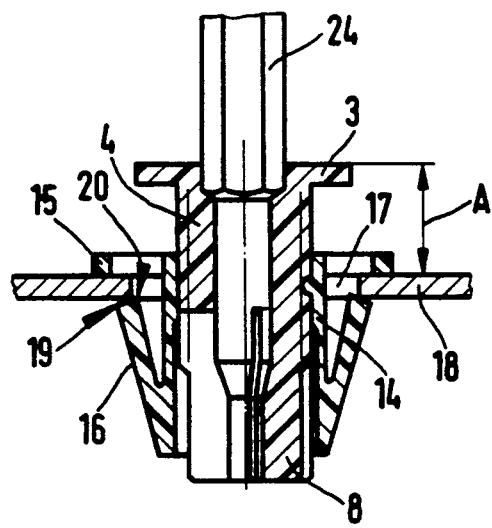
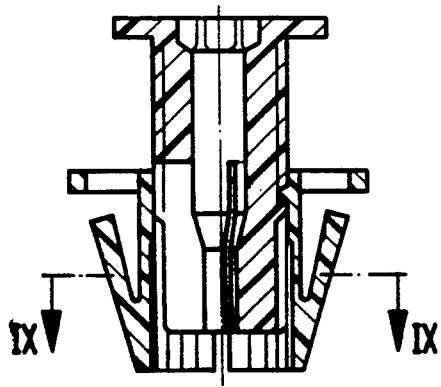
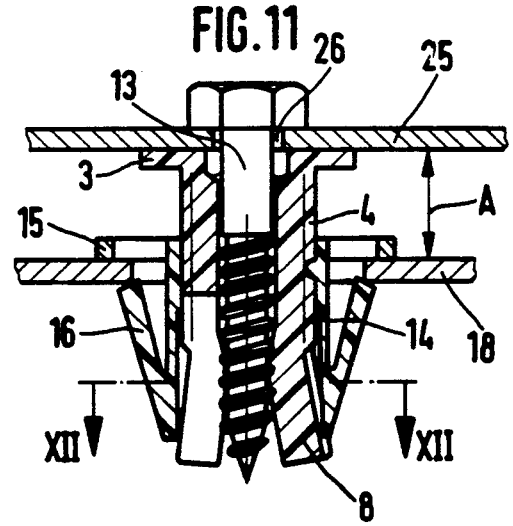
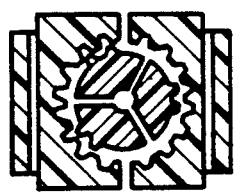
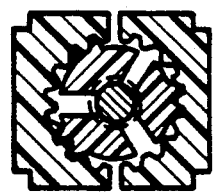

ADJUSTABLE SPACER

BACKGROUND OF THE INVENTION

This invention relates to a spacer of plastic for securing two plate-shaped components together in spaced relationship with means for adjusting the spacing between them.

A spacer of this kind is often used in the manufacture of motor vehicles. For example, it is often used to secure panelling to the door, where a large variation between the metal frame and the panelling components can be encountered. This spacer is, however, only intended to ensure the desired spacing between the two components; the securing of the parts to one another being done by other means.

However, in certain situations, such as for example when securing a radiator grill to a fixed frame, it would be advantageous if the grill resting on the supporting head of the spacer could be fastened directly to the spacer. Unfortunately, this is not possible in the case of known spacers.

Accordingly, it is the object of the present invention to provide a spacer such that after the spacing between the components has been adjusted, it will be possible to fasten or screw the supported component directly to the spacer.

SUMMARY OF THE INVENTION

This object is achieved according to the present invention by providing an adjustable spacer made of plastic for securing two plate-shaped components together with variable spacing, comprising an anchoring part adapted to be inserted into and secured in a compatible hole in a first one of said components and having a cylindrical hollow shaft with an internal threaded portion on its internal surface and a spacing screw part having an externally threaded shaft portion that can be screwed into the hollow shaft of the anchoring part to adjust the spacing between the two parts, said spacing screw part having a supporting head on its upper end for receiving the second one of said components and on its lower end below the threaded shaft portion an expanding stem portion comprising a plurality of downwardly extending legs separated by axis-parallel openings and connected at their upper ends to said threaded shaft portion, a through-hole extending through said screw part that tapers in said expanding stem to a narrower hole for receipt of a threaded member and at least one axis-parallel rib on the external surface of each leg, said anchoring part having a plurality of axis parallel grooves on the internal surface of its hollow shaft below its threaded portion for receiving in a positive locking manner the ribs on the legs of the expanding stem to prevent relative rotation between the two parts when a threaded member is screwed into the through-hole of the spacing screw part to secure the second plate component to the supporting head of the spacing screw part.

BRIEF DESCRIPTION OF THE DRAWINGS

A preferred exemplary embodiment of the invention is illustrated in the drawings and will be explained in greater detail below. Of the drawings:

FIG. 1 is a longitudinal sectional view of the spacing screw part of the spacer of the invention taken along the line I—I in FIG. 2;

FIG. 2 is a top view of the spacing screw;

FIG. 3 is a cross-sectional view through the expanding stem of the spacing screw taken along the line III——III in FIG. 1;

FIG. 4 is a longitudinal sectional view of the associated anchoring part of the spacer taken along the line IV—IV in FIG. 5;

FIG. 5 is a top view of the anchoring part;

FIG. 6 is a cross-sectional view of the shaft of the anchoring part taken along the line VI—VI in FIG. 4;

FIG. 7 shows the spacing screw part and anchoring part before assembly;

FIG. 8 shows the preassembled spacer;

FIG. 9 is a sectional view taken along the line IX—IX in FIG. 8;

FIG. 10 shows the preassembled spacer clipped into a carrier plate and the wrench used for adjusting the supporting height of the spacing screw part;

FIG. 11 shows the spacer in its finished state of installation; and

FIG. 12 is a cross-sectional view through the expanded stem of the spacing screw part and the expanded shaft of the anchoring part taken along the line XII——XII in FIG. 11.

DETAILED DESCRIPTION OF THE INVENTION

The spacer illustrated in FIGS. 7-12 consists of a spacing screw part 1, as shown in detail in FIGS. 1-3, and an anchoring part 2, as shown in detail in FIGS. 4-6. The spacer is intended to support with variable spacing and to secure two plate-shaped components 18 and 25 to one another in spaced relationship. It can be used, for example, in the manufacture of motor vehicles to secure the protective grill in front of the radiator.

Spacing screw part 1 is made from a hard, flexible plastic and consists of a supporting head 3, a threaded shaft 4 and a dowel-like expanding stem 6 adjacent thereto. Stem 6 is divided up into three expanding legs or segments 8 by three longitudinal slits 7 distributed around over its circumference. Expanding segments 8 formed by the slits 7 correspond in their external diameter "d" to the core diameter "k" of the threaded shaft 4 and have on their external surfaces 9, in each case, two axis-parallel ribs 10 per segment. In supporting head 3 there is a hexagon socket recess 11, from the base of which extends a through-hole 5 for a receipt of a fastening screw 13. See FIG. 11. Hole 5 tapers in lower expanding stem 6 to a smaller through-hole 12, so that as a screw 13 or other threaded member is screwed into spacing screw part 1, expanding segments 8 will be pressed radially outwards.

Anchoring part 2 is likewise manufactured from a hard, flexible plastic and consists of a hollow shaft 14 having a flange 15 on its upper end and a pair of supporting legs 16 formed on its lower end that project obliquely upwards from the lower end of shaft 14. The external walls 28 of shaft 14 are arranged quadratically to one another and are intended to be inserted into a rectangular hole 17 in a carrier plate 18 (FIG. 10). With this arrangement, anchoring part 2 is anchored in plate 18 with flange 15 resting on the upper side of the carrier plate 18 while legs 16 engage the under side. When the spacer is inserted into hole 17, supporting legs 16 initially move inwards and after passing the edge 20 of hole 17, they spring outwards again coming to rest with their upper edges 19 lying against the edge 20 of hole 17 and the under side of plate 18. Between supporting legs 16, hollow shaft 14 has two axis-parallel slits 27 that extend up to just below flange 15 to divide the lower end of the anchoring part into two segments. See FIGS. 4 and 6.

The internal surface of shaft 14 is of cylindrical shape and corresponds to the external diameter "g" of the threaded shaft 4 of spacing screw part 1 and has in its upper regions a thread 21 which is interrupted by recesses 22 that correspond with the position and width of each two adjacent ribs 10 of spacing screw part 1. See FIGS. 4 and 5. Below thread 21, grooves 23 are formed on the inside of shaft 14 parallel to the shaft's axis, the grooves corresponding in form and spacing from one another to the ribs 10, with the inner contact diameter "B" of the grooves being slightly larger than the outer diameter "b" of ribs 10.

When assembling the spacer, spacing screw part 1 is inserted from above, as shown in FIG. 7, into the shaft 14 of anchoring part 2, the ribs 10 being aligned in such a way that they can slide through the recesses 22. The spacing screw part 1 slides through until the external thread of threaded shaft 4 meets the thread 21. Thereafter, spacing screw 1 is turned once or twice in a clockwise direction, whereby the spacer is preassembled ready for shipping and mounting as shown in FIG. 8.

When using the preassembled spacer and with the spacer clipped into the right-angled securing hole 17 of carrier plate 18 so that flange 15 rests on top of the carrier plate 18 and the supporting legs 16 rest with their upper edges 19, as already described, loosely against the bottom of the plate and against the edges 20 of hole 17, it is then possible to adjust the spacer to the desired spacing for the components.

This is accomplished by turning spacing screw part 1 into anchoring part 2 with a hexagon socket wrench 24 until the desired spacing "A" between the upper edge of carrier plate 18 and the upper edge of supporting head 3 is set (FIG. 10). Then a second plate 25 can be laid on the supporting head 3 and fastened to spacing screw part 1 by means of a screw 13. For this purpose, in the second plate 25 there is a hole 26 for passing through screw 13. As screw 13 penetrates the dowel-like expanding stem 6, of spacing screw part 1, expanding segments 8 are pressed outwards with ribs 10 sinking into grooves 23 in anchoring part 2 (FIG. 12). In this way, spacing screw part 1 in the shaft 14 of anchoring part 2 is secured against further turning so that screw 13 can be tightened without difficulty.

As can be appreciated by designing the lower region of the spacing screw part merely as an expanding dowel would not itself solve the problem because then when screwing in screw 13, the expanding dowel would tend to turn in the shaft of the anchoring part. This tendency is prevented according to the present invention by the rapid expansion of the expanding segments 8 in conjunction with the braking effect of ribs 10 in the grooves 23 since, when screwing in the screw, the ribs are pressed outwardly by the expanding dowel segments into the outer grooves and rest there in a positive locking manner. In this way, at any desired spacing a firm anchoring is achieved.

In addition, the expanding force of screw 13 is transmitted via the expanding segments 8 and the shaft 14 divided by the slits 27 to the supporting legs 16 which are thereby in turn pressed firmly up against the edges 20 of the hole 17, so that the anchoring part 2 is now also anchored rigidly in hole 17.

Thus it can be seen that by means of the slits in the lower shaft region of anchoring part 2, the expanding force of the screw is transmitted via the dowel segments and the shaft to the supporting legs This has the advantage that when tightening the screw, the upper edges of the supporting legs are at the same time pressed firmly against the edges of the hole, so that the initially still displaceable anchoring part is also rigidly anchored in the elongated hole upon screwing in of screw 13.

Of course, the spacer according to the invention also can be used with a countersunk screw or it can be used merely as a spacing means or stop or support. As will be appreciated, the above-mentioned anchoring effect in conjunction with the accurate adjustment capability of its two parts relative to each other and the securing of a screw to it provides a very useful and versatile adjustable spacer.

We claim:

1. An adjustable spacer made of plastic for securing two plate-shaped components together with variable spacing, said adjustable spacer comprising an anchoring part adapted to be inserted into and secured in a compatible hole in a first one of said components and having a cylindrical hollow shaft with an internal threaded portion on its internal surface, said hollow shaft having an internal diameter and a thread diameter in its threaded portion, and a spacing screw part having an externally threaded shaft portion that can be screwed into the internal threaded portion of the hollow shaft of the anchoring part to thereby permit adjustment in the spacing between the two parts, said threaded shaft portion having a thread diameter and a core diameter, said spacing screw part having a supporting head on its upper end above the threaded shaft portion for receiving the second one of said components, said supporting head being spaced outwardly from said anchoring part when the spacing screw part is screwed into the anchoring part, and having on its lower end below the threaded shaft portion an expanding stem portion comprising a plurality of downwardly extending legs separated by axis-parallel slits and connected at their upper ends to said threaded shaft portion, a through-hole extending through said screw part that tapers in said expanding stem to a narrower hole for receipt of a threaded member and at least one axis-parallel rib on the external surface of each leg, said anchoring part having a plurality of axis parallel grooves on the internal surface of its hollow shaft below the threaded portion for receiving in a positive locking manner the ribs on the legs of the expanding stem to prevent relative rotation between the two parts when a threaded member is screwed into the through-hole of the spacing screw part to secure the second plate component to the supporting head of the spacing screw part, the external diameter of the legs of the expanding stem portion of the spacing screw part being equal to the core diameter of the threaded shaft portion of the spacing screw and the outer diameter of the ribs being equal to the thread diameter of the threaded shaft portion and slightly smaller than the internal diameter of the hollow shaft of the anchoring part and the thread diameter of the internal threaded portion of the hollow shaft of the anchoring part being less than the internal diameter of the shaft, wherein said internal threaded portion consists of a single thread having recesses therein corresponding to the positions of the ribs on the legs of the expanding stem so that the ribs can pass by the thread as the spacing screw part is inserted into the anchoring part and before the threaded shaft portion of the spacing screw part engages said internal threaded portion of the anchoring part.

2. The adjustable spacer of claim 1, wherein the anchoring part has a flange on its upper surface adapted to rest against a top surface of said first component and on its lower end a plurality of resilient legs that extend obliquely upwards, whereby when the anchoring part is pushed into the hole in said first component the legs flex inwardly and then spring back outwardly to rest against the bottom surface of said first component.

3. The adjustable spacer of claim 2, wherein the lower end of said anchoring part is divided into at least two segments by axis-parallel slits so that as the threaded member expands the legs of the expanding stem and pushes their ribs into the grooves in the hollow shaft of the anchoring part, the segments of said anchoring part are also pushed outwardly to force said resilient legs tightly against said first plate component.

* * * * *